United States Patent
Garofalo et al.

(10) Patent No.: US 8,028,035 B2
(45) Date of Patent: *Sep. 27, 2011

(54) SHARED RESOURCE SUPPORT FOR INTERNET PROTOCOLS

(75) Inventors: Frances C. Garofalo, Woodstock, NY (US); Jeffrey D. Haggar, Holly Springs, NC (US); Bruce H. Ratcliff, Red Hook, NY (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/265,895

(22) Filed: Nov. 6, 2008

(65) Prior Publication Data
US 2009/0063707 A1   Mar. 5, 2009

Related U.S. Application Data

(63) Continuation of application No. 10/134,555, filed on Apr. 29, 2002, now Pat. No. 7,478,139.

(51) Int. Cl.
G06F 15/167 (2006.01)
G06F 15/16 (2006.01)

(52) U.S. Cl. .......... 709/215; 709/245; 709/250

(58) Field of Classification Search .......... 709/215, 709/245, 250; 711/1, 5, 153; 710/9; 712/13
See application file for complete search history.

(56) References Cited

U.S. PATENT DOCUMENTS

| | | |
|---|---|---|
| 5,740,438 A | 4/1998 | Ratcliff et al. |
| 5,835,725 A | 11/1998 | Chiang et al. |
| 5,872,524 A | 2/1999 | Iida |
| 6,018,771 A | 1/2000 | Hayden |
| 6,021,429 A | 2/2000 | Danknick |
| 6,128,294 A | 10/2000 | Oura et al. |
| 6,175,891 B1 | 1/2001 | Noman et al. |
| 6,249,527 B1 | 6/2001 | Verthein et al. |
| 6,272,127 B1 | 8/2001 | Golden et al. |
| 6,314,501 B1 | 11/2001 | Gulick et al. |
| 6,330,616 B1 | 12/2001 | Gioquindo et al. |
| 6,633,916 B2 | 10/2003 | Kauffman |
| 6,880,000 B1 | 4/2005 | Tominaga et al. |
| 7,216,227 B2 | 5/2007 | Grynberg |
| 7,281,059 B2 | 10/2007 | Ruy et al. |
| 7,788,345 B1 * | 8/2010 | Sukiman et al. .............. 709/220 |
| 2001/0049740 A1 | 12/2001 | Karpoff |

(Continued)

OTHER PUBLICATIONS

Hinden et al. Network Working Group RFC 2373, Jul. 1998, Cisco Systems pp. 1-19.

(Continued)

*Primary Examiner* — Douglas Blair
*Assistant Examiner* — Benjamin Ailes
(74) *Attorney, Agent, or Firm* — Steven Chiu

(57) ABSTRACT

Creating a unique identification for each stack in partitions of a host data computer such that a plurality of partitions may share a single adapter card during an Input/Output operation wherein the adapter card is exchanging data between the host and a Local Area Network. The adapter card includes a unique identifier pool for maintaining values of unique identifiers which are available for identifying the stacks. A deleted unique identifier for a stack may be reused by newly created stacks and may be reassigned to a recreated stack, if still available, when the stack had previously been deleted by the operating system, but is then recreated.

8 Claims, 6 Drawing Sheets

U.S. PATENT DOCUMENTS

| | | | |
|---|---|---|---|
| 2002/0022483 A1 | 2/2002 | Thompson et al. | |
| 2002/0026525 A1 | 2/2002 | Armitage | |
| 2002/0038382 A1 | 3/2002 | Ryu et al. | |
| 2002/0069278 A1 | 6/2002 | Forslow | |
| 2002/0133573 A1 | 9/2002 | Matsuda et al. | |
| 2002/0133620 A1 | 9/2002 | Krause | |
| 2003/0110292 A1 | 6/2003 | Takeda et al. | |
| 2003/0126396 A1 | 7/2003 | Camble et al. | |
| 2003/0145122 A1 | 7/2003 | Banerjee et al. | |
| 2009/0049199 A1* | 2/2009 | Kuik et al. | 709/245 |
| 2009/0063706 A1* | 3/2009 | Goldman et al. | 709/250 |
| 2009/0327462 A1* | 12/2009 | Adams et al. | 709/222 |
| 2010/0153525 A1* | 6/2010 | Parekh et al. | 709/221 |
| 2010/0325292 A1* | 12/2010 | Takeda et al. | 709/228 |

OTHER PUBLICATIONS

USPTO U.S. Appl. No. 10/134,555, filed Jan. 13, 2009 to F. C. Garofalo et al., Office Action dated Jun. 16, 2005.
USPTO U.S. Appl. No. 10/134,555, filed Jan. 13, 2009 to F. C. Garofalo et al., Office Action dated Mar. 22, 2006.
USPTO U.S. Appl. No. 10/134,555, filed Jan. 13, 2009 to F. C. Garofalo et al., Office Action dated Jan. 26, 2007.
USPTO U.S. Appl. No. 10/134,555, filed Jan. 13, 2009 to F. C. Garofalo et al., Office Action dated Jun. 25, 2007.
USPTO U.S. Appl. No. 10/134,555, filed Jan. 13, 2009 to F. C. Garofalo et al., Office Action dated Dec. 26, 2007.
USPTO U.S. Appl. No. 10/134,555, filed Jan. 13, 2009 to F. C. Garofalo et al., Notice of Allowance dated Sep. 5, 2008.

* cited by examiner

CREATEADDR REQUEST

| OFFSET | LENGTH | DESCRIPTION |
|---|---|---|
| 0 | 1 | CODE = 'C3'X |
| 1 | 1 | INITIATOR = '00'X – TCP/IP |
| 2 | 2 | SEQUENCE NUMBER SET BY INITIATOR |
| 4 | 2 | RETURN CODE |
| 6 | 1 | LAN TYPE |
| 7 | 1 | RELATIVE ADAPTER NUMBER |
| 8 | 1 | VERSION |
| 9 | 1 | COUNT FIELD |
| 10 | 2 | VERSION:<br>'0006'X – IPv6 |
| 12 | 4 | IP ASSISTS SUPPORTED |
| 16 | 4 | IP ASSISTS ENABLED |
| 20 | n | PRIMITIVE SPECIFIC |
| 20 | 8 | IDENTIFIER |

CREATEADDR REPLY

| OFFSET | LENGTH | DESCRIPTION |
|---|---|---|
| 0 | 1 | CODE = 'C3'X |
| 1 | 1 | INITIATOR = '00'X - TCP/IP |
| 2 | 2 | SEQUENCE NUMBER SET BY INITIATOR |
| 4 | 2 | RETURN CODE<br>'0000'X - SUCCESS<br>'0001'X - COMMAND NOT SUPPORTED<br>'0003'X - FAILED REASON UNKNOWN<br>'0020'X - IP VERSION INCORRECT<br>'0012'X - NO IDENTIFIERS AVAILABLE<br>'E004'X - INVALID LAN NUMBER |
| 6 | 1 | LAN TYPE |
| 7 | 1 | RELATIVE ADAPTER NUMBER |
| 8 | 1 | VERSION |
| 9 | 1 | COUNT FIELD |
| 10 | 2 | VERSION:<br>'0006'X - IPv6 |
| 12 | 4 | IP ASSISTS SUPPORTED |
| 16 | 4 | IP ASSISTS ENABLED |
| 20 | n | PRIMITIVE SPECIFIC |
| 20 | 8 | UNIQUE IDENTIFIER |

DESTROYADDR REQUEST

| OFFSET | LENGTH | DESCRIPTION |
|---|---|---|
| 0 | 1 | CODE = 'C4'X |
| 1 | 1 | INITIATOR = '00'X - TCP/IP |
| 2 | 2 | SEQUENCE NUMBER SET BY INITIATOR |
| 4 | 2 | RETURN CODE |
| 6 | 1 | LAN TYPE |
| 7 | 1 | RELATIVE ADAPTER NUMBER |
| 8 | 1 | VERSION |
| 9 | 1 | COUNT FIELD |
| 10 | 2 | VERSION:<br>'0006'X - IPv6 |
| 12 | 4 | IP ASSISTS SUPPORTED |
| 16 | 4 | IP ASSISTS ENABLED |
| 20 | n | PRIMITIVE SPECIFIC |
| 20 | 8 | UNIQUE IDENTIFIER |

DESTROYADDR REPLY

| OFFSET | LENGTH | DESCRIPTION |
|---|---|---|
| 0 | 1 | CODE = 'C4'X |
| 1 | 1 | INITIATOR = '00'X - TCP/IP |
| 2 | 2 | SEQUENCE NUMBER SET BY INITIATOR |
| 4 | 2 | RETURN CODE<br>'0000'X - SUCCESS<br>'0001'X - COMMAND NOT SUPPORTED<br>'0003'X - REASON UNKNOWN<br>'0020'X - IP VERSION INCORRECT<br>'0013'X - IDENTIFIER NOT FOUND<br>'E004'X - INVALID LAN NUMBER |
| 6 | 1 | LAN TYPE |
| 7 | 1 | RELATIVE ADAPTER NUMBER |
| 8 | 1 | VERSION |
| 9 | 1 | COUNT FIELD |
| 10 | 2 | VERSION:<br>'0006'X - IPv6 |
| 12 | 4 | IP ASSISTS SUPPORTED |
| 16 | 4 | IP ASSISTS ENABLED |
| 20 | n | PRIMITIVE SPECIFIC |
| 20 | 8 | UNIQUE IDENTIFIER THAT WAS DELETED |

SHARED RESOURCE SUPPORT FOR INTERNET PROTOCOLS

CROSS-REFERENCE TO RELATED APPLICATIONS

The present application is a continuation of U.S. patent application Ser. No. 10/134,555 "Shared resource support for internet protocol" filed Apr. 29, 2002 now U.S. Pat. No. 7,478,139, the contents of which are incorporated by reference herein in their entirety.

BACKGROUND OF THE INVENTION

The present invention is related to the transfer of data in an environment using Operating System (OS) stacks wherein the data transfer is between LAN devices or clients and the OS stack via an adapter wherein each OS stack has a unique identifier, as is more particularly related to an apparatus and method for assigning a unique identifier to each OS stack such that the OS stacks may be shared by an adapter.

Operating System (OS) stacks are established to enable Input/Output (I/O) transfer of data by Logical Partitions (LPARs) established in the host of a data processing system. When data is received from or sent to a Local Area Network (LAN), the data is transmitted through an adapter which is connected between the host and the LAN. Typically, every adapter must have a unique Media Access Control (MAC) address per OS stack attached to it. In Operating Systems, such as the z/OS operating system available from IBM, thousands of LPARs may exist at one time, with each LPAR possibly having one or more OS stacks. However, it is not feasible to provide an adapter for each of these OS stacks. Thus, it is necessary to find a way to assign a plurality of OS stacks to a single adapter. However the addressing scheme of the present Internet Protocol version 4 (IPv4) has a limited number of available addresses which may be assigned.

Internet Protocol Version 6 (IPv6) is the next generation protocol designed by the Internet Engineering Task Force to replace the current version IPv4. Most of today's internet uses IPv4, which is now nearly twenty years old. IPv4 has been remarkably resilient in spite of its age, but it is beginning to have problems. Most importantly, there is a growing shortage of IPv4 addresses, which are needed by all new machines added to the Internet.

IPv6 fixes a number of problems in IPv4, such as the limited number of available IPv4 addresses. It also adds many improvements to IPv4 in areas such as routing, network auto-configuration, expanded addressing capabilities, header format simplification, improved support for extensions and options, flow labeling capability, and consolidated authentication and privacy capabilities.

The merits of IPv6 can be summarized as follows:

scalability: IPv6 uses 128 bit address space. Address length is 4 times longer than IPv4.

security: IPv6 basic specification includes security. It includes packet encryption (ESP:Encapslated Security Payload) and source authentication (AH:Authentication Header).

real-time: To support real-time traffic such as video conference, IPv6 has "Flow Label". Using flow label, router can know which end-to-end flow a packet belongs to, and then find out the packet which belongs to real-time traffic.

autoconfiguration: IPv6 basic specification includes address autoconfiguration. So, even novice users can connect their machines to network.

specification optimization: IPv6 succeeds good parts and discards old and useless parts of IPv4.

IPv4 addresses are grouped into 5 classes. Class A, B, and C, addresses support unicast communication. Class D addresses support IP multicasting. Class E addresses are experimental. IPv4 addresses are 32 bit in length and follow the convention provided in the Table 1.

TABLE 1

| Class | Range | Type |
| --- | --- | --- |
| A | 0.0.0.0 to 127.255.255.255 | unicast |
| B | 128.0.0.0 to 191.255.255.255 | |
| C | 192.0.0.0 to 223.255.255.255 | |
| D | 224.0.0.0 to 239.255.255.255 | multicast |
| E | 240.0.0.0 to 247.255.255.255 | experimental |

IPv6 addresses are 128 bits in length and have the format shown in Table 2 for a unicast address.

TABLE 2

| 3 bits | 13 bits | 8 bits | 24 bits | 16 bits | 64 bits |
| --- | --- | --- | --- | --- | --- |
| FP | TLA ID | Res | NLA ID | SLA ID | Interface ID |
| <-- Public Topology-------------> | | | | Site <--------> Topology | |
| | | | | | <---Interface Identifier--> |

Where

| | |
| --- | --- |
| FP | Format Prefix (001) |
| TLA ID | Top-Level Aggregation Identifier |
| RES | Reserved for future use |
| NLA ID | Next-Level Aggregation Identifier |
| SLA ID | Site-Level Aggregation Identifier |
| INTERFACE ID | Interface Identifier |

SUMMARY OF THE INVENTION

It is an object of the present invention to provide a method and apparatus for assigning a unique identifier to each OS stack which is used in a logical partition of a host computer which communicates with a LAN client through an open source adapter.

It is a further object of the present invention to provide an open source adapter with a unique identifier pool and a method and apparatus to add the unique identifier of an OS stack to the identifier pool.

It is a further object of the present invention to provide a method and apparatus wherein a command to the open source adapter causes the adapter to generate the unique identifier of an OS stack.

It is also an object of the present invention to provide a method and apparatus wherein a command to the open source adapter causes the adapter to remove a unique identifier of an OS stack from the unique identifier pool of the adapter such that the unique identifiers may be reused.

It is also an object of the present invention to provide a method and apparatus wherein an OS stack may request that it be given a specific unique identifier.

It is a further object of the present invention to provide a method and apparatus wherein the unique identifier of an OS stack includes a unique identifier to the MAC address of the adapter.

BRIEF DESCRIPTION OF THE DRAWINGS

These and other objects will be apparent to one skilled in the art from the following detailed description of the invention taken in conjunction with the accompanying drawings in which:

FIG. 3 is a diagrammatic illustration of a CREATEADDR request sent to the open source adapter to establish the unique identifier for an OS stack;

FIG. 4 is a diagrammatic illustration of a CREATEADDR reply wherein the open source adapter returns the assigned unique identifier to the OS stack;

FIG. 5 is a diagrammatic illustration of a DESTROYADDR request sent to the open source adapter to destroy the unique identifier such that the unique identifier may be reused; and FIG. 6 is a diagrammatic illustration of a DESTROYADDR reply wherein the open source adapter replies that the unique identifier has been deleted from the unique identifier pool.

DETAILED DESCRIPTION OF THE INVENTION

Figure 1:
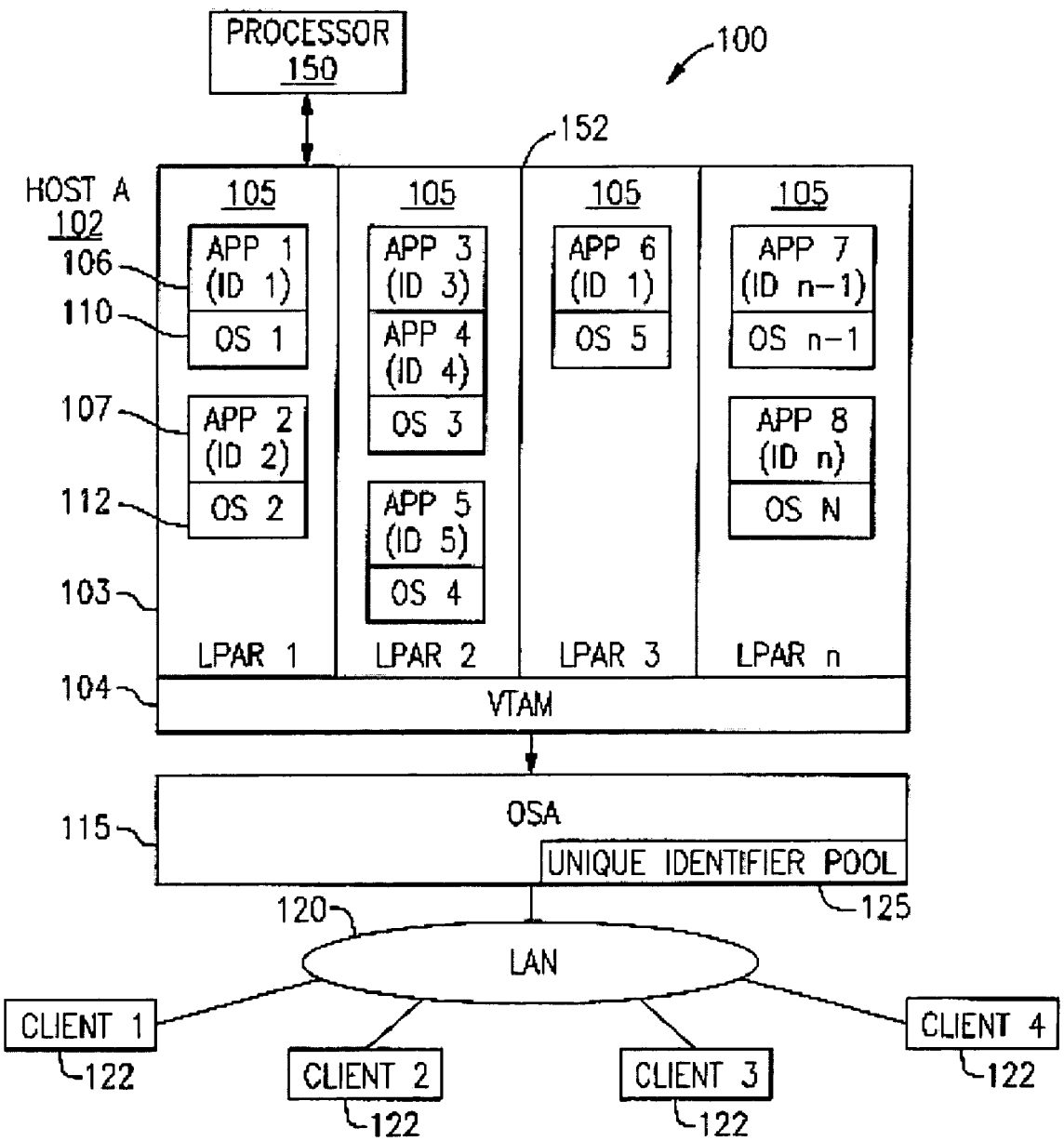
FIG. 1 is a schematic diagram of a data processing system in which applications in LPARs of a host computer exchanges data with LAN clients via an open source adapter which has a unique identifier pool in which are registered unique identifiers of the OS stack of each application.

FIG. 1 is a schematic diagram of a data processing system 100 having a host computer A 102 having a processor 150 and a memory 152. As is well understood, the memory 152 contains computer coding which is executable by the processor 150, and may include, for instance, operating systems and applications for processing data. The computer executable code may be understood as having a plurality of layers. Two layers are shown in FIG. 1, the Logical Partition (LPAR) layer 103, and the VTAM layer 104. The LPAR layer 103 is shown having a plurality of LPARs 105 shown as LPAR1-LPARn. Each LPAR 105 may support one or more applications, which each application having its own identification. For instance, LPAR1 has two applications, App1 106 and App2 107, with each application having an identification id1 and id2, respectively. When an application in an LPAR wishes to communicate, the Operating System establishes an OS stack. In LPAR1, App1 106 has an OS stack OS1 110, and App2 107 has OS stack OS2 112, while in LPAR2, applications App3 and App4 share the OS stack OS3. It thus will be understood that each application may have its own OS stack, or that it may share an OS stack with another application.

The Virtual Telecommunications Access Method (VTAM) layer 104 provides telecommunication access by applications in the host by issuing instructions, as understood by those skilled in the art. The VTAM layer 104 communicates with an Open Source Adapter (OSA) 115 which is a computer card controlling communications between the applications in the host 102 and a Local Area Network (LAN) 120. The LAN 120 is connected to clients 122 with which applications in the host 101 may exchange data. The OSA 115 includes a unique identifier pool 125 in which is stored the unique identifiers of the OS stacks established by the operating system for the applications in the LPAR layer 103. The unique identifiers are assigned to the OS stacks by the OSA 115, as will be explained. The unique identifiers are forwarded by the OSA 115 over the LAN to clients 122 such that clients may communicate with the applications, as is well known. Part of the unique identifier is the MAC address for the OSA 115, and part of the identifier is a unique extension assigned by the OSA 115 to designate only one OS stack, such that many OS stacks and thus many applications may share connections to the LAN 120 via a single OSA 115.

The IPv6 standard defines a mechanism to assign addresses to interfaces that uses an IEEE 48 bit MAC identifier. Every card or adapter must have a unique mac address per OS stack attached to it. For sharing between OS stacks or LPARs, a mechanism is provided to uniquely generate addresses for a particular interface. A new set of commands is introduced that uniquely manages a set of 64K unique values to combine with the local 48 bit MAC to form a unique 64 bit identifier for each OS Stack. In addition, a mechanism and algorithm is provided to assign a stack with a consistent address set that does not jeopardize the uniqueness of the generated identifiers.

The OSA card 115 manages a 64K bit string that represents 1 of 64K unique identifiers. Every time an OS stack activates the adapter, a CREATEADDR command is generated and sent to the OSA card 115. The OSA card 115 then searches the unique identifier pool 125 to find the next available bit. The OSA 115 then returns that identifier to the requesting stack. The returned 16 bit identifier is then combined with the 48 bit MAC addresses of the OSA card 115 to provide a totally unique addresses to represent this application address on the IPv6 network. The mixing of the returned identifier and MAC address is OS dependent. It can place the 16 bits in any bit position of the 64 bit identifier to generate the unique identifier. Each time an OS stack deactivates the adapter, a DESTROYADDR command is issued thus returning the saved identifier to the pool of available values. If an OS stack reactivates the adapter the OS stack may try to retrieve its previous identifier so that the OS stack retains the same IPv6 addresses for this adapter. If the OS stack has another active interface onto the same LAN, the OS stack can provide fault tolerance for these IPv6 addresses across the deactivation and subsequent reactivation of the adapter. This retrieving of an old identifier is done by putting the last 64 bit identifier that the OS stack used into the CREATEADDR identifier field. If the old value is still unassigned, it will be returned to the OS stack, and the reassigned identifier will then be marked unavailable on the OSA bit mask. Thus through this central identifier pool 125, many OS applications (in a single or multiple LPAR system) can share the same adapter on the IPv6 network.

The OSA 115 is allowed to reuse and share the same unique identifier for fault tolerance reasons. Each back-end application can be mapped into a common identifier so that in the case of a node failure, another node can take over in a seamless transition to the end user. Since the OSA 115 is common to the user applications, it can assure that a unique identifier is selected for each application (not simply an LPAR identifier since there can be thousands of unique addresses in a singular LPAR) all sharing a single 48 bit MAC address.

Figure 2:
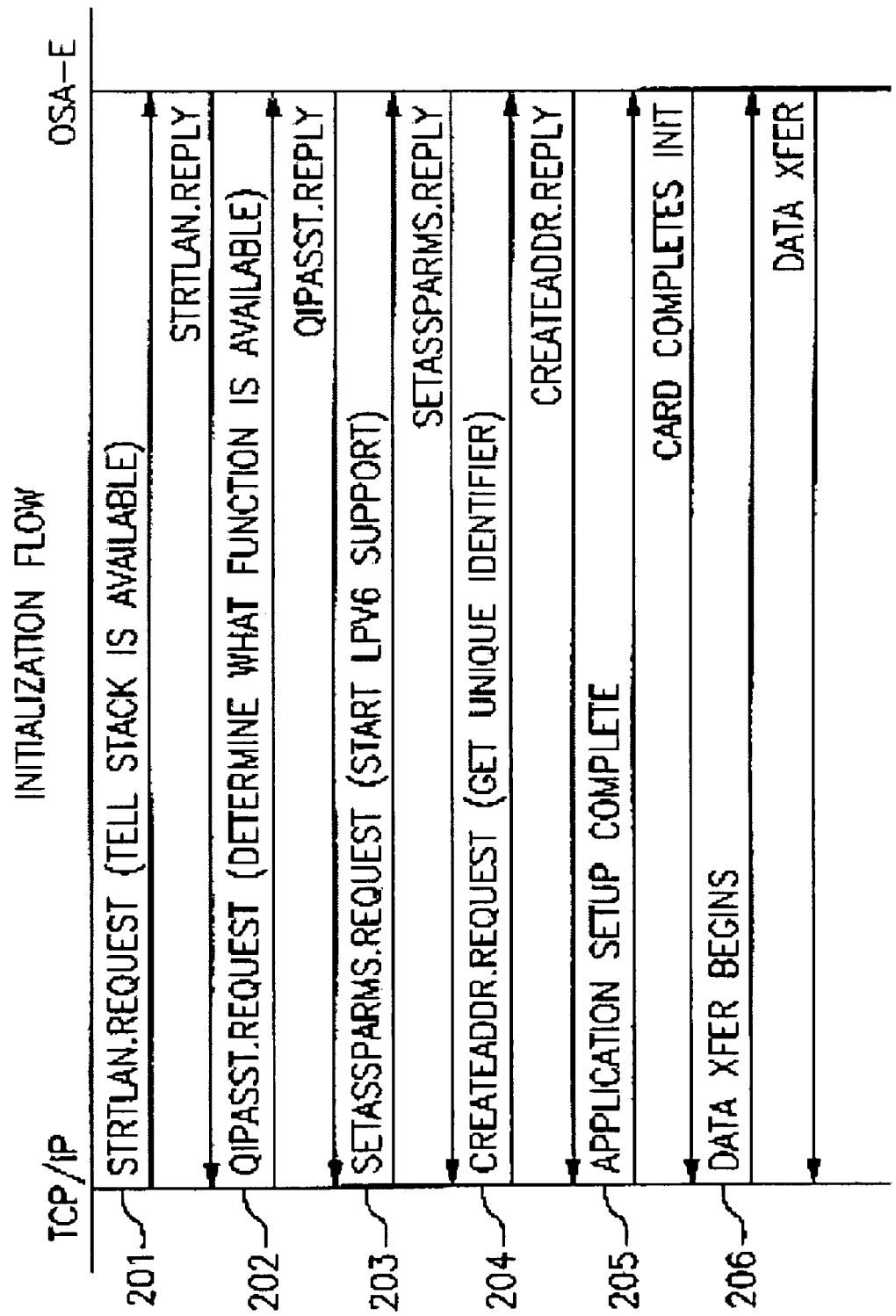
FIG. 2 is diagrammatic illustration of the initialization flow of messages sent between an application wishing to initiate a data transfer wherein a unique identifier is established and data transfer is accomplished.

FIG. 2 is an illustration of the initialization flow for initiating a data transfer between an application and a LAN client 122. Using, for instance, the Transmission Control Protocol/Internet Protocol(TCP/IP) protocols, at 201 a STRTLAN.request is sent to the OSA 115 to tell the card that a new OS stack is available. In response, a STARTLAN.reply is returned. At 202, a QIPASST.request is sent to the OSA 115 to determine what function is available. In response, a QIPASST.reply is returned. At 203, a SETASSPARMS.request is sent to the OSA 115 card to start IPv6 support. In response, a SETASSPARMS.reply is sent. At 204, a CREATEADDR.request is sent to the OSA card 115 to get a unique identifier assigned to the new OS stack. At this point, the OSA 115 searches the Unique Identifier Pool 125 to determine the next available value to be used as the unique identifier for the new OS stack. A CREATEADDR.reply is returned containing the unique identifier as shown in FIG. 4. At 205, the Application Setup is completed and the OSA card 115 returns a reply to indicate the setup. It will be understood that the setup is dependent on the operating system being used, the particular application, and perhaps the LAN clients 122 involved. At 206, the data transfer between the application and the client begins and continues until completed.

FIG. 3 is a diagram of the CREATEADDR.request sent at 204. It will be noted that an identifier 301 may be included if the OS stack wishes to use a previous unique identifier. FIG. 4 is a diagram of the CREATEADDR.reply sent by the OSA 115 in response to the CREATEADDR.request. The unique identifier 401 for the OS stack will be included. If the requested identifier 301 is available, the unique identifier 401 will be the same as the requested identifier 301. If the requested identifier 301 is not available, the unique identifier 401 will be the next available value as determined by the OSA 115.

FIG. 5 is a diagram of the DESTROYADDR.request sent to the OSA 115 by the operating system if an OS stack is removed. The DESTROYADDR.request includes the unique identifier value 501 to be deleted. FIG. 6 is a diagram of the DESTROYADDR.reply sent in response to the DESTROYADDR.request. The unique identifier 601 in the DESTROYADDR.reply is the value of the unique identifier that was deleted. The deleted unique identifier 601 will then be made available for the next CREATEADDR.request received by the OSA 115.

While the preferred embodiment of the invention has been illustrated and described herein, it is to be understood that the invention is not limited to the precise construction herein disclosed, and the right is reserved to all changes and modifications coming within the scope of the invention as defined in the appended claims.

The invention claimed is:

1. A program product for communicating with devices on a LAN for use in a data processing system having a processor, a memory connected to said processor, said memory having at least one partition having an operating system for execution by said processor and at least one application, and an adapter connected to said processor and capable of being connected to said LAN, said adapter having a MAC address unique in said LAN, said program product comprising;

one or more non-transitory computer readable media having recorded thereon, computer executable computer coding for performing a method comprising:

creating an OS stack in said memory by said operating system for use by an application for sending and receiving data;

maintaining in a unique identifier pool in said adapter, values of unique identifiers identifying OS stacks in partitions in said memory;

sending from said operating system, a first create request to said adapter asking said adapter to assign a unique identifier to the OS stack created by said operating system for use by said application for sending and receiving data;

combining by said adapter, the next available value with its LAN unique MAC address and assigning it to said created OS stack as its unique identifier and returning the unique identifier to the operating system for use by said application for sending and receiving data;

sending a delete request to said adapter when the operating system removes an OS stack, said delete request including the unique identifier assigned to the OS stack to be deleted;

making the value for the identifier in the delete request available responsive to its receipt of the delete request; and sending from said operating system, a second create request to said adapter asking said adapter to assign the same identifier to the OS stack that was previously assigned before the identifier was deleted by the delete request.

2. The program product of claim 1 wherein said method further comprises:

including in said create request, a requested value;

determining if the requested value is available; and returning the requested value as the unique identifier for the OS stack if the requested value is available.

3. The program product of claim 1 wherein said method further comprises including in said memory, a plurality of partitions, said plurality of partitions sharing said adapter for sending and receiving data.

4. The program product of claim 3 wherein said method further comprises including in said memory, more than one application in a partition, said applications sharing a single OS stack for sending and receiving data.

5. A system for communicating with devices on a LAN comprising:

a processor;

a memory connected to said processor, said memory having at least one partition having an operating system for execution by said processor and at least one application;

an adapter connected to said processor and configured to be connected to said LAN, said adapter having a MAC address unique in said LAN;

wherein said system is configured to perform a method comprising:

creating an OS stack in said memory by said operating system for use by an application for sending and receiving data;

maintaining in a unique identifier pool in said adapter, values of unique identifiers identifying OS stacks in partitions in said memory;

sending from said operating system, a first create request to said adapter asking said adapter to assign a unique identifier to the OS stack created by said operating system for use by said application for sending and receiving data;

combining by said adapter, the next available value with its LAN unique MAC address and assigning it to said created OS stack as its unique identifier and returning the unique identifier to the operating system for use by said application for sending and receiving data;

sending a delete request to said adapter when the operating system removes an OS stack, said delete request including the unique identifier assigned to the OS stack to be deleted;

making the value for the identifier in the delete request available responsive to its receipt of the delete request; and sending from said operating system, a second create request to said adapter asking said adapter to assign the same identifier to the OS stack that was previously assigned before the identifier was deleted by the delete request.

6. The system of claim 5, wherein the method further comprises:
   including in said create request, a requested value;
   determining if the requested value is available; and
   returning the requested value as the unique identifier for the OS stack if the requested value is available.

7. The system of claim 5, wherein said method further comprises including in said memory, a plurality of partitions, said plurality of partitions sharing said adapter for sending and receiving data.

8. The system of claim 7 wherein said method further comprises including in said memory, more than one application in a partition, said applications sharing a single OS stack for sending and receiving data.

* * * * *